Nov. 18, 1969  W. S. HOSEK  3,478,760
HERMETICALLY SEALED VALVE MEANS
Filed May 17, 1966  3 Sheets-Sheet 1

WILLIAM S. HOSEK
INVENTOR.

BY Thomas W. Brannan

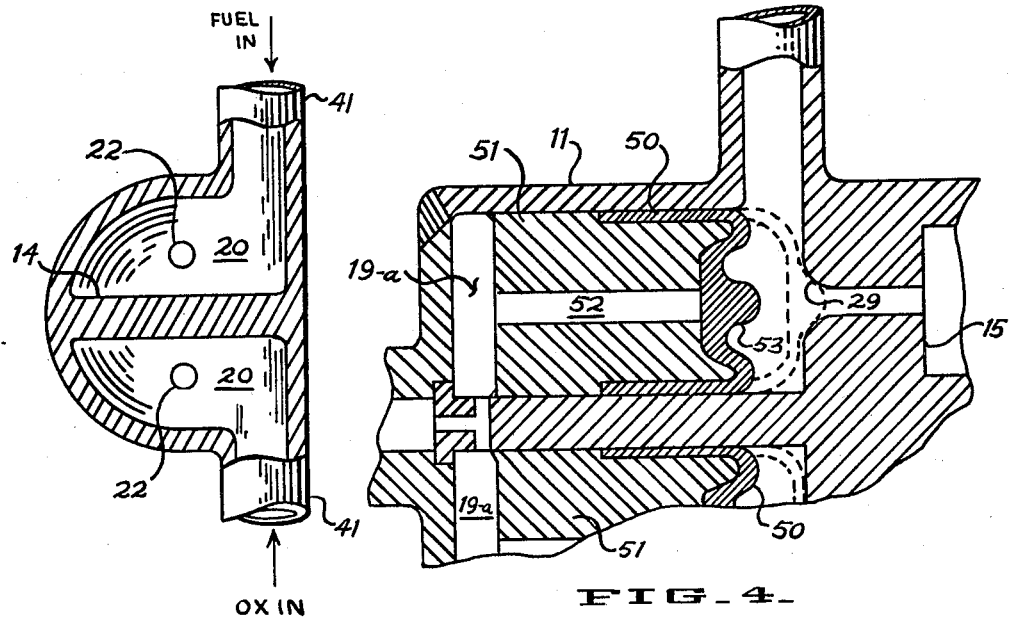
FIG_2_
FIG_4_
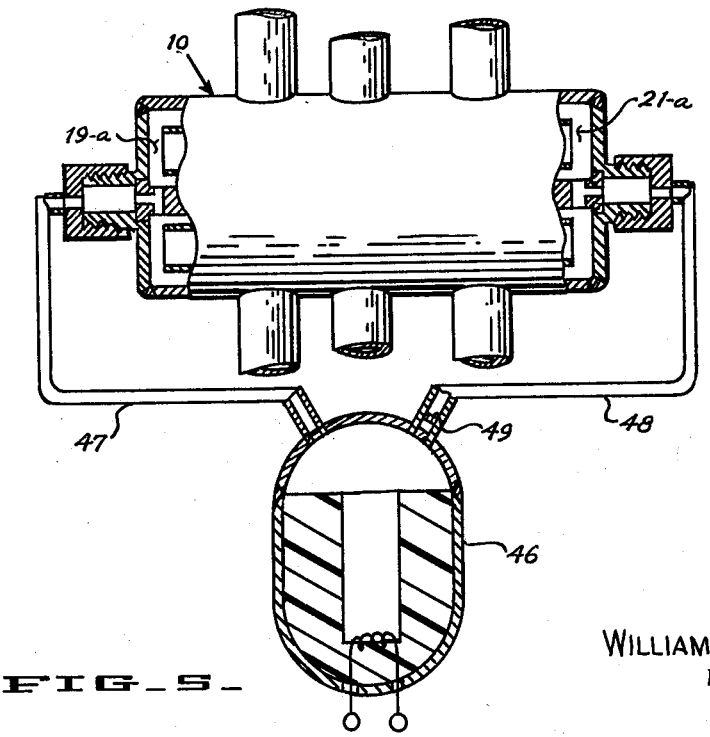
FIG_5_
WILLIAM S. HOSEK
INVENTOR.
BY Thomas W. Brennan

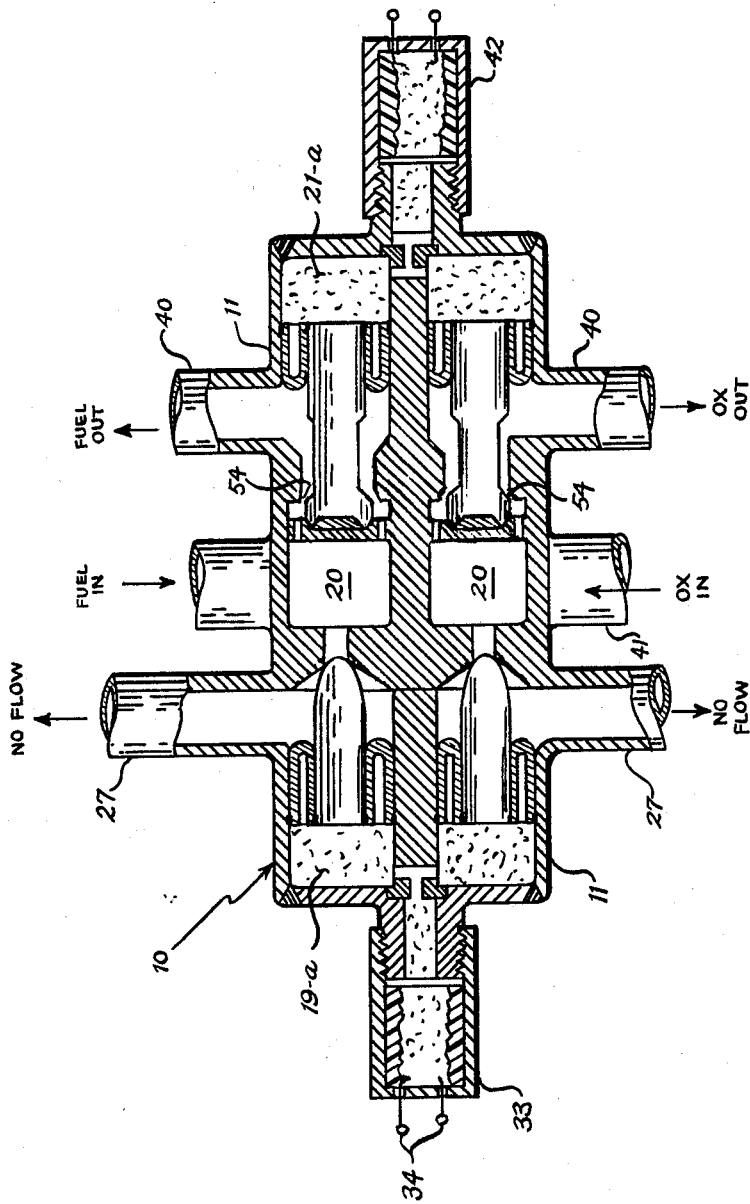

United States Patent Office 3,478,760
Patented Nov. 18, 1969

3,478,760
HERMETICALLY SEALED VALVE MEANS
William S. Hosek, Mount Tabor, N.J., assignor to Thiokol Chemical Corporation, Bristol, Pa., a corporation of Delaware
Filed May 17, 1966, Ser. No. 550,699
Int. Cl. F16k 13/04, 17/14, 17/40
U.S. Cl. 137—68        7 Claims

ABSTRACT OF THE DISCLOSURE

A valving apparatus having a single inlet and two outlets, one outlet having a normally open valve which is closed and the other outlet having a normally closed valve which is simultaneously or shortly thereafter opened. The valve actuation is by an explosive device. A parallel noncommunicating flow path is provided in the apparatus which is controlled by identical valves and programming.

---

Figure 1:
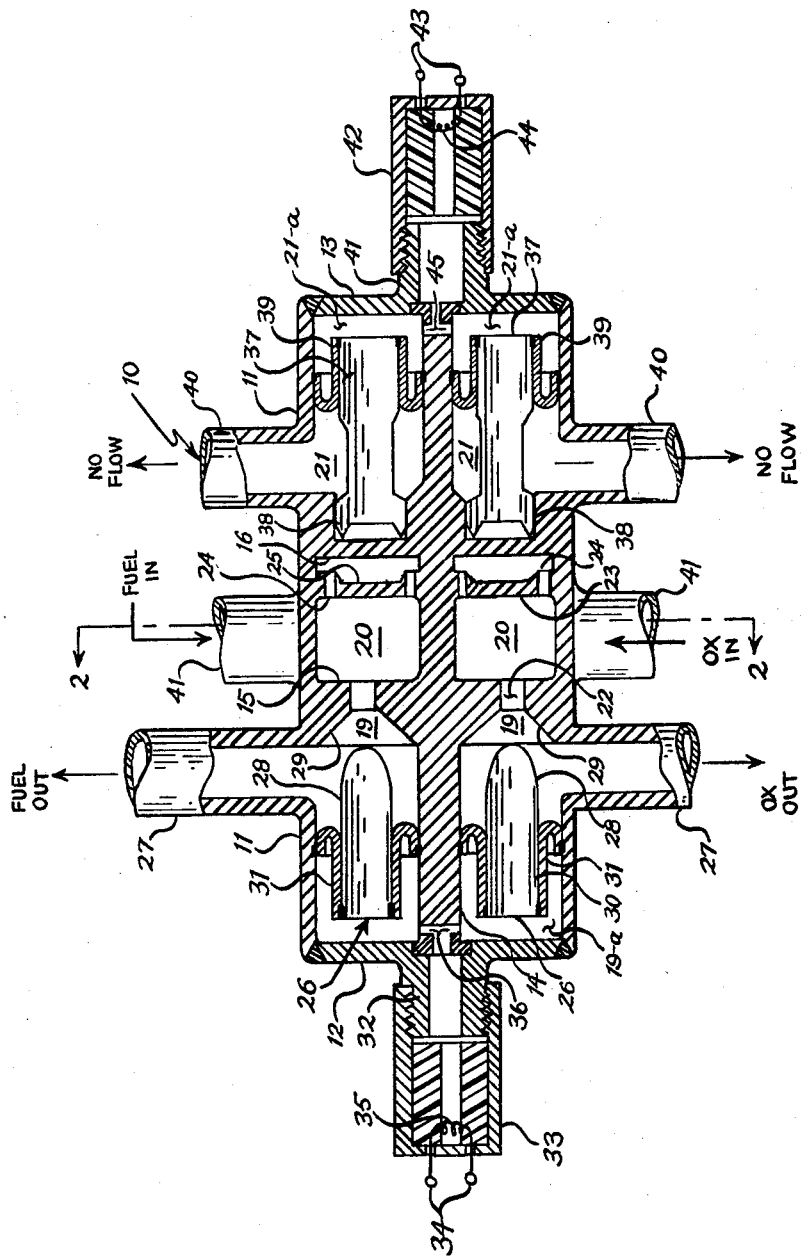

This invention relates in general to valves, and more particularly to normally open valves actuable on demand to shut off fluid flow through one section of the valve and either simultaneously or time sequentially thereafter to initiate fluid flow through another section of the valve, usually from a common valve inlet.

In accordance with the above it is preferred that the means used for actuation of the valve be an explosive device of the type known to the art as a "squib" having a combustible material of rapid burning characteristic which generates high pressure and, usually, high temperature gas. In general many substances are available for use in these squibs and include black powder, any of many solid or liquid propellants which when ignited, as by a hot wire, or other electrical signal, generate gas under pressure. This pressurized gas can then be directed or contained in some manner to propel or move a device such as a piston or the like which thereafter performs some useful work.

In the hereinafter to be described invention the above indicated actuation is utilized to drive or propel a poppet or valve closure means which thereafter closes or shuts off fluid flowing through the valve. Simultaneously with the above or time sequentially thereafter, another portion of the valve is also actuated, either by means of the same generated gas, or by means of one or more additional squibs, to initiate flow through that valve portion or section.

In addition to the above, means is provided to isolate the fluid flow regions involved from the gas and residue thereof, which is in the form of a flexible, impermeable hermetic seal.

Accordingly it is an object of this invention to provide a valve comprising movable elements for shutting off and initiating flow of fluid wherein the actuating means is hermetically sealed from the movable elements.

It is another object of the invention to provide a valve of the character referred to wherein movable elements are actuated from a normally open position to shut off fluid in one part of the valve while simultaneously, or time sequentially thereafter, an additional movable element is actuated to initiate flow through another part of the valve.

It is still another object of the invention to provide a valve of the character described wherein the movable elements are hermetically sealed from the actuation means before and after actuation thereof.

With these and other objects of the invention, which will become more apparent from the following specification, the invention resides in the novel features of construction, arrangement and combination of parts hereinafter to be described and claimed in conjunction with the drawings attached, in which:

FIGURE 1 is a sectional elevation of the invention with the movable elements in position prior to actuation;
FIGURE 2 is a view of the invention taken along the line 2—2 of FIGURE 1;
FIGURE 3 is a view of the invention similar to FIGURE 1 except that the elements are shown at a time subsequent to actuation thereof;
FIGURE 4 is a partial sectional view of an alternate form of the movable elements of the invention; and,
FIGURE 5 is a view of the invention in another embodiment thereof.

Referring now to the drawings, and in particular to FIGURE 1, there is shown in cross section a valve 10 of generally dual construction, as might be used in controlling the flow of one or more fluids such as propellant to a rocket motor combustion chamber (not shown). Valve 10 comprises a walled body 11 having welded end plates 12 and 13. Body 11 comprises an internal central member 14 and transverse members 15 and 16. Central member 14 divides valve 10 and body 11 thereof into two distinct valve housings 17 and 18 and together with laterally positioned or formed member 15 and shearable member 16, form fluid receiving compartments 19 and 20 and 21 in each housing 17 and 18. In FIGURE 1, member 15 comprises a fluid passage 22 (see also FIGURE 2) whereby fluid flow between compartments 19 and 20 is permitted. An additional member 23 is included in each compartment 20 which also contains a pair of fluid passages 24. Member 23 is formed with a recess 25 between passages 24 which, as will become apparent hereinafter, performs a very useful function.

Compartments 19 each have contained within them a closing device or element in the form of a poppet 26. A fluid outlet 27 provides external communication to a downstream utilitarian purpose. Juxtaposed with the head end 28 of each poppet 26 is a valve seat 29 in member 15. Surrounding the body or root portion 30 of poppet 26 is a skirted annular diaphragm seal 31 which hermetically seals each compartment 19 from the chamber 19–a formed by the interior surface of end plate 12 and diaphragm 31. Diaphragm 31 is made of impervious material such as thin metal or the like and is fastened at one of its ends to poppet 26, root end 30 and at the other to the interior surface of body 11. Thus as poppet 26 is moved toward seat 29, diaphragm 31 undergoes a rolling motion therewith while still hermetically sealing compartment 19, as will be further explained in what follows.

End plate 12 includes a gas fitting 32 on which is installed a gas generator cartridge or squib 33. Electrical leads 34 attached to a power source (not shown) lead to hot wire igniter 35 embedded in a combustible charge or propellant squib 33 for ignition thereof. Gas flow passages 36 are provided in the end of central member 14, whereby fluid communication is established between squib 32 and chamber 19–a.

Similarly, each compartment 21 includes a movable device, or element in the form of a ram or poppet 37, juxtaposed with shearable barrier or member 16 and includes a cutter 38 in one end thereof. Also surrounding each element 37 is a skirted annular diaphragm seal 39 which hermetically seals each compartment 21 from a chamber 21–a formed by the interior surface of end plate 13, diaphragm 39 and body 11 interior. Each diaphragm 39 is similar in all respects to each diaphragm 31 on movable poppet 26 in compartments 19, and is similarly attached to body 11 interior and poppet 37. Outlets 40 lead out from compartments 21 and permit fluid flow therefrom to a downstream utilitarian purpose.

End plate 13 also comprises a gas fitting 41 on which is installed a gas generator cartridge or squib 42. Electrical leads 43 connected to a hot wire igniter 44 embedded in a combustible charge of propellant for ignition thereof to provide gas pressure in chamber 21-a through the fluid passages 45 in the opposite end of central member 14.

Alternatively, of course pressurization of chambers 19-a and 21-a can be accomplished by a single squib charge as schematically shown in FIGURE 5 wherein a single charge 46 is connected by separate conduits 47 and 48 to chambers 19-a and 21-a and such is contemplated for use in this invention. Other means for accomplishing poppets 26 and 37 movement include direct mechanical coupling drive or hydraulic means (not shown) which can also be used and are considered within the realm of the inventive concept herein.

Referring again to FIGURE 1 central compartment 20, as stated above, is formed between members 15 and 16 and has flow passage 24 containing partition 23 for receiving a portion of rupturable member 16 in recess 25 thereof. Each compartment 20 receives fluid from a source (not shown) through a fluid inlet 41. Fluid communication in outlets 27 and 40 is established through ports or passages 22 in member 15 and passages 24 in partition 23, and in operation, through rupture of a portion of member 16 respectively.

In FIGURE 4 an alternate form of closing device, useful in place of closing poppet 26 and diaphragm 31 of FIGURE 1, is shown. In this embodiment a diaphragm 50, similar in material to diaphragm 31 is held fast in compartment 19-a between the internal surface of body 11 and a stationary plug 51 having a longitudinal passage 52 therethrough.

Diaphragm 50 is flexible and comprises a thickened forward portion or protuberance 53 shaped in the form of a poppet. Poppet protuberance 53 is juxtaposed in compartment 19-a with valve seat 29 in member 15 in FIGURE 1 and operable under pressure to seat therein as shown by the dotted lines in FIGURE 4.

In operation of the invention of FIGURE 1 reference may be had thereto and to FIGURE 3. Valve 10 in FIGURE 1 is shown in use as a propellant valve in a liquid propellant rocket motor. Fluids such as fuel and oxidizer, are shown being received in upper and lower compartments 20 respectively. Each propellant is to be considered flowing into its respective compartment 19 through each passage 22 and subsequently out through outlets 27 to a downstream utilitarian system, usually the rocket motor combustion chamber. No flow is occurring through outlets 40 or into compartments 21.

In the event however that total fuel and oxidizer flow is required to be changed, a signal is sent to the hot wire igniter 35 through leads 34 and the propellant in squib 33 is ignited generating high pressure gas, thereafter pressurizing chambers 19-a and creating a force against closure poppets 26 urging them to move to the right. Poppets 25 heads 28 are thus wedged into seats 29 shutting off propellant flow through both outlets 27. Simultaneously or shortly thereafter a signal may be sent to igniter wire 44 through leads 43 to ignite squib 42 charge material thereby generating high pressure gas. This gas enters chamber 21-a through passage 45 in central member 14 end and operates against movable element, ram or poppet 37 urging it leftward in the figure (see FIGURE 3). In moving leftward cutter 38 of poppet 37 shears a portion of shearable barrier 16 which is retained thereafter in recess 25 of partition 23. An annular flow path 54 is thus opened behind cutting head 38 and fluid flows from compartments 20 through passages 24 and newly formed passages 54 into compartments 21 and thence away from valve 10 through outlets 40 to a downstream system such as the combustion chamber of a rocket motor.

As has been hereinbefore stated, it is desirable in operating many fluid systems that separation between one fluid and another and between an actuating fluid and a fluid being controlled be maintained throughout use. The herein described valve 10 accomplishes this end by means of hermetic diaphragms 31 and 39. In operating poppet 26 to urge it to shut-off fluid flowing into compartment 19 hot gas and solid residue entrained therein is stopped from contacting fuel or oxidizer in compartments 19 because diaphragm 31 is impervious to passage of said hot gas. However due to its flexibility, it undergoes a rolling action, as seen in FIGURE 3, which permits poppet 26 to move into seat 29 all the while sealing compartment 19 from the hot gas generated. In addition poppet 26 provides support for diaphragm 31 from buckling pressure while the body 11 supports it in hoop pressure. Further by providing proper material and by shaping head 28 accordingly, poppet 26 can be locked in seat 29 thereby making a leakproof seal therebetween.

Similarly, ram or poppet 37, by means of its cutter end 38, is operative dynamically to initiate flow while its rolling diaphragm 39 provides hermetic isolation of hot gas from propellant in compartments 21. Simultaneously buckling and hoop stress support for diaphragm 39 is also provided by poppet 37 and body 11 respectively.

Operation of the invention embodied in FIGURE 4 is substantially the same as above described except gas from squib 33 enters chamber 19-a and acts against the hot gas side of diaphragm 50 causing it to roll outward toward member 15. Poppet-like protuberance 53 is then seated in seat 29 and flow therethrough is shut-off.

Operation of the FIGURE 5 device is similar to the FIGURE 1 invention except that simultaneous shut-off of flow into compartments 19 and invention of flow into compartments 21 is effected by simultaneous flow of hot gas to chamber 19-a and 21-a through conduits 47 and 48 respectively. Sequencing can also be obtained in FIGURE 5 by provision of a metering or delay orifice 49 in either conduit 47 or 48 depending upon the degree of sequencing desired.

What is claimed is:

1. A valve having a body provided with internal structural members defining a plurality of fluid receiving compartments, said members having fluid passages for fluid conduction between said compartments, at least one of said compartments having a fluid inlet for supplying fluid from an external source, at least two other compartments having a fluid outlet for conducting fluid exteriorly of said valve, a normally open valve means in one of said fluid outlet containing compartments, a valve seat formed in one end of at least one of said passages in one of said members juxtaposed with the end of said valve means for preventing fluid flow through said one passage when said valve means is in the closed position, means for closing said valve means, a hermetic seal attached to said valve means and to said body for hermetically sealing said outlet containing compartment from said closing means, a shearable barrier forming a common wall between the other of said outlet containing compartments and said inlet containing compartment for preventing fluid flow therebetween, a fluid passage containing member in said inlet compartment having a recess and being spaced apart from said shearable barrier, means in said other outlet containing compartment comprising a movable element, cutter means on one end of said element juxtaposed with said shearable barrier, means for moving said element so as to remove a portion of said barrier, said portion being received in the recess in said spaced apart member establishing fluid communication between said inlet containing compartment and said other outlet containing compartment, and means on said element and attached to said body interior for hermetically sealing said other outlet containing compartment from said element moving means.

2. The valve of claim 1 wherein the normally open valve means is a movable poppet.

3. The valve of claim 1 wherein the normally open valve means comprises a stationary plug having a fluid passage and a diaphragm sealingly positioned thereon between said plug and said valve body, said diaphragm comprising a poppet-like protuberance juxtaposed with said fluid passage seat and responsive to fluid pressure in said plug passage to engage said seat.

4. The valve of claim 1 wherein tthe means for closing said valve means and for moving said movable element is a gas generator cartridge.

5. The valve of claim 1 wherein the hermetic seal is a flexible metal diaphragm attached to said body interior at one of its ends and to said poppet at its other end.

6. The valve of claim 1 wherein said movable element hermetic sealing means comprises a flexible metal diaphragm attached to said body and to said element on the end of said element opposite said cutting means.

7. A propellant valve for a liquid propellant rocket motor, said propellants including an oxidizer and a fuel, said valve having a body and internal structural members defining a plurality of separated oxidizer and fuel receiving compartments, said members defining said oxidizer compartments having passages for conduction of oxidizer between said oxidizer compartments and said fuel compartments having passages for conduction of fuel between said fuel compartments, at least one of each of said oxidizer and fuel compartments having an inlet for supplying said oxidizer and fuel from an external source to said respective compartments, at least two other oxidizer and fuel compartments each having an outlet for conduction of fluid externally of said valve, a normally open valve means in one of each of said oxidizer outlet and fuel outlet containing compartments juxtaposed therein with the end of said passage in one of said members for preventing flow of oxidizer and fuel therethrough when in the closed position, means for closing said oxidizer and fuel valve means, hermetic seal means attached to said oxidizer and fuel valve means and to said body interior for hermetically sealing said oxidizer and fuel outlet containing compartments from said closing means, a shearable barrier interposed between said oxidizer and fuel inlet containing compartments and one of each of said other oxidizer and fuel outlet containing compartments for preventing flow of oxidizer and fuel thereinto, an oxidizer passage containing member and a fuel passage containing member in said oxidizer and fuel inlet containing compartments respectively, each having a recess and being spaced apart from said shearable barrier therein, means in one of each of said oxidizer and fuel outlet containing compartments comprising a movable element, cutter means on one end of each of said elements juxtaposed with said shearable barrier, means for moving said movable elements to remove a portion of said barriers, said removed portions being received in said recesses in said spaced apart members initiating oxidizer and fuel flow into the respective other oxidizer and fuel outlet containing compartments from said inlet containing compartments, and means attached to each of said elements and to said body for hermetically sealing said other oxidizer and fuel outlet containing compartments from said element moving means.

References Cited

UNITED STATES PATENTS

| | | | |
|---|---|---|---|
| 2,928,240 | 3/1960 | Burton et al. | 60—240 XR |
| 3,033,216 | 5/1962 | Morgan et al. | 137—68 |
| 3,117,417 | 1/1964 | Rutkowski | 60—258 XR |
| 3,240,011 | 3/1966 | Gershon | 60—240 |

CLARENCE R. GORDON, Primary Examiner

R. GERARD, Assistant Examiner

U.S. Cl. X.R.

60—240, 258; 137—608; 251—331